United States Patent
Qian et al.

(10) Patent No.: US 9,921,442 B2
(45) Date of Patent: Mar. 20, 2018

(54) METHOD FOR FORMING AN ALIGNMENT LAYER OF A LIQUID CRYSTAL DISPLAY DEVICE AND DISPLAY DEVICE MANUFACTURED THEREBY

(71) Applicant: OmniVision Technologies, Inc., Santa Clara, CA (US)

(72) Inventors: Yin Qian, Milpitas, CA (US); Dyson Hsin-Chih Tai, San Jose, CA (US); Ming Zhang, Fremont, CA (US); Chia-Chun Miao, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 191 days.

(21) Appl. No.: 14/995,548

(22) Filed: Jan. 14, 2016

(65) Prior Publication Data
US 2017/0205653 A1 Jul. 20, 2017

(51) Int. Cl.
*G02F 1/1337* (2006.01)
*G02F 1/136* (2006.01)

(52) U.S. Cl.
CPC ........ *G02F 1/136* (2013.01); *G02F 1/133788* (2013.01)

(58) Field of Classification Search
CPC ........... G02F 1/13378; G02F 1/133734; G02F 1/13439; G02F 2001/133776
USPC ........................................................ 349/123
See application file for complete search history.

(56) References Cited

U.S. PATENT DOCUMENTS

| | | | | |
|---|---|---|---|---|
| 6,939,587 B1* | 9/2005 | Kumar | ............... | G02F 1/133788 349/124 |
| 8,246,911 B2* | 8/2012 | Abbott | ................... | G01N 21/75 422/412 |
| 2002/0135721 A1* | 9/2002 | Fijol | ................. | G02F 1/133734 349/123 |
| 2006/0256267 A1* | 11/2006 | Bone | ................. | G02F 1/133553 349/122 |
| 2007/0042505 A1* | 2/2007 | Israel | ............... | G01N 33/54373 436/518 |
| 2012/0125424 A1* | 5/2012 | Wenham | ............. | H01L 21/2252 136/256 |
| 2014/0043572 A1* | 2/2014 | Tang | ................... | G02F 1/13378 349/123 |

* cited by examiner

*Primary Examiner* — Hoan C Nguyen
(74) *Attorney, Agent, or Firm* — Larry E. Henneman, Jr.; Gregory P. Gibson; Henneman & Associates, PLC (57) ABSTRACT

A novel method of forming an alignment layer of a liquid crystal display device includes the steps of providing a substrate (e.g., a processed silicon wafer, etc.) having an alignment layer material deposited thereon and applying a series of pulses from a pulse laser to anneal portions of the alignment layer material and alter its surface morphology. The method can include the step of depositing the alignment layer material (e.g., a spin-on dielectric including $SiO_2$) over the substrate using a spin-on process prior to laser annealing. Applying the series of laser pulses creates a repetitive pattern of features that facilitate alignment of liquid crystals according to a laser scan trace. Liquid crystal display devices with laser-annealed alignment layer(s) are also disclosed. The alignment layers of the invention are quickly and inexpensively applied and are very robust under prolonged, high-intensity light stress.

24 Claims, 10 Drawing Sheets

METHOD FOR FORMING AN ALIGNMENT LAYER OF A LIQUID CRYSTAL DISPLAY DEVICE AND DISPLAY DEVICE MANUFACTURED THEREBY

BACKGROUND

Field of the Invention

This invention relates generally to liquid crystal display (LCD) devices and methods of manufacturing them. Even more particularly the invention relates to methods for forming alignment layers used in LCD displays.

Description of the Background Art

Figure 1:
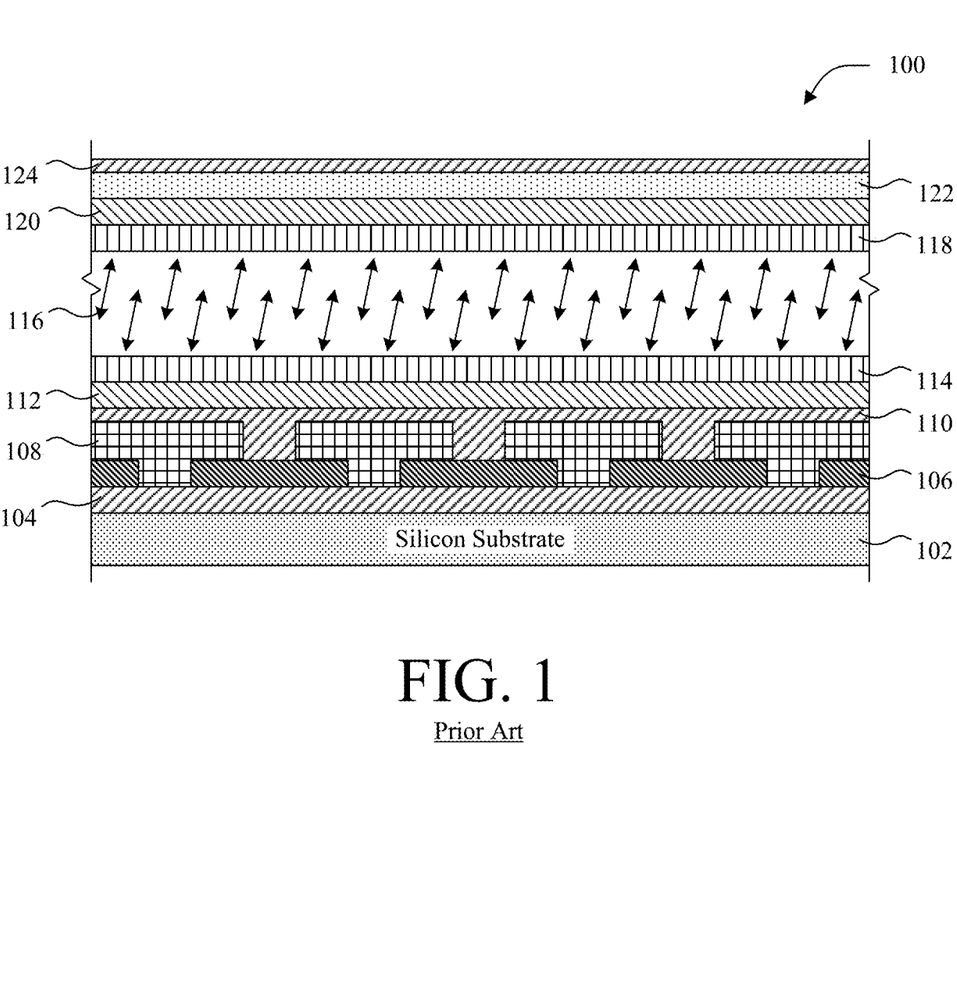
FIG. 1 is a cross-sectional view showing a known liquid crystal display device.

Reflective and transmissive LCD devices are used in video projectors, rear projection televisions, computer displays, and other devices as a means for producing high-quality imagery. FIG. 1 shows a known liquid crystal display device 100, which in this embodiment, is a reflective liquid crystal on silicon (LCOS) light valve. Display device 100 is formed on a silicon substrate 102, and includes integrated circuitry 104, an insulating layer 106, a plurality of pixel mirrors 108, a planarized layer 110, a protective coating 112, a lower liquid crystal alignment layer 114, a liquid crystal layer 116, an upper liquid crystal alignment layer 118, a transparent electrode layer 120, a transparent (e.g., glass) substrate 122, and an anti-reflective coating 124. The thicknesses of the layers depicted in FIG. 1 are not shown to scale, but are instead are drawn to be clearly visible.

Mirrors 108 are coupled to circuitry layer 104 through a plurality of vias formed in insulating layer 106. Planar layer 110 and protective layer 112 provide a flat, relatively robust surface for subsequent layers of the device. Alignment layers 114 and 118 help to properly align the liquid crystals of layer 116. Transparent electrode 120 (e.g., Indium Tin Oxide) and antireflective coating 124 are formed on the bottom and top surfaces, respectively, of glass substrate 122. Alignment layer 118 is formed on transparent electrode 120.

During operation, light passes through all of upper layers 124, 122, 120, 118, 116, 114, 112, and 110 of display device 100 to impinge on pixel mirrors 108. The light is reflected from the top surfaces of mirrors 108 and then exits the device again passing through upper layers 110, 112, 114, 116, 118, 120, 122, and 124. The polarization of the light is altered by liquid crystal layer 116, depending on the electrical field applied across liquid crystal layer 116. When transparent electrode 120 is held at a particular voltage, the electrical field across liquid crystal layer 116 is controlled by the voltages asserted on pixel mirrors 108 by circuitry layer 104. Thus, the polarization of spatially pixilated portions of the incident light can be individually modulated.

Alignment layers 114 and 118 provide a means of aligning the nematic liquid crystals of liquid crystal layer 116. This alignment is accomplished by inducing a topographical asymmetry in the surfaces of alignment layers 114 and 118, which controls the bulk orientation of the liquid crystals in the liquid crystal layer 116.

One known method for forming alignment layers includes forming a polyimide layer and then mechanically rubbing the polyimide layer in a predetermined direction to create the topographical asymmetry. One common limitation of polyimide alignment layers is that they are not very stable under high intensity and/or prolonged illumination. Indeed, after tens of hours of light stress, polyimide alignment layers can degrade enough to cause flares (e.g., unwanted lighter areas) in the displayed images. And, after several hundred hours of light stress, the degradation is severe enough to cause permanent black areas in a displayed white image and/or permanent white areas in a black image. In other words, light stress will cause display devices having polyimide alignment layers to fail over time, resulting in diminished optical performance, costly warranty repairs/recalls, and/or lost customers.

To address the limitations of polyimide alignment layers, electron-beam evaporated thin film alignment layers were developed. These evaporated alignment layers are formed by the oblique evaporation of silicon dioxide ($SiO_2$). While such evaporated alignment layers have been found to be stable under light stress, they have several drawbacks. First, the vacuum deposition method is both complicated and expensive, requiring solid, high-purity $SiO_2$, a chamber held under high vacuum, and an electron gun and power supply. Moreover, manufacturing throughput is also very low due to the slow $SiO_2$ growth rate. These drawbacks result in the display devices being more expensive to produce.

What is needed, therefore, is an efficient and inexpensive method for forming a robust alignment layer in an LCD device. What is also needed is an LCD device having alignment layer(s) that are stable after prolonged light stress.

SUMMARY

The present invention overcomes the problems associated with the prior art by providing a novel method for forming the alignment layer(s) of a liquid crystal display device by annealing alignment layer material (e.g., spin-on dielectric) with laser light. Liquid crystal display devices of the invention include alignment layer(s) that are very stable under prolonged, high-intensity light stress and that are easily and inexpensively manufactured with high throughput.

A method of forming an alignment layer of a display device according to the invention includes the steps of providing a substrate having an alignment layer material deposited thereon and applying light to the alignment layer material to alter a surface morphology of the alignment layer material. According to a particular method, the step of providing a substrate having an alignment layer material deposited thereon includes depositing the alignment layer material over the substrate using a spin-on process. The alignment layer material can include a spin-on dielectric (SOD) and, in particular, a SOD comprising silicon dioxide ($SiO_2$).

In another particular method, the step of applying light to the alignment layer material includes applying a series of pulses from a pulse laser to anneal portions of the alignment layer material. The series of pulses can be applied along a predetermined path with respect to the substrate, for example, by applying a predetermined number of pulses (e.g., one) to the alignment layer material at a first location along the predetermined path to alter the surface morphology of the alignment layer material near the first location and then applying the predetermined number of laser pulses to the alignment layer material at a second location along the predetermined path to alter the surface morphology of the alignment layer material near the second location. In an even more particular method, the series of pulses is applied along a plurality of parallel paths and the parallel paths are defined such that pulses applied to adjacent ones of the parallel paths overlap by a predetermined amount (e.g., approximately 50%).

The step of applying the series of laser pulses from the pulse laser creates a repetitive pattern of features (e.g., a plurality of generally-parallel valleys) on the surface of the alignment layer material. When the step of applying the series of pulses from the pulse laser includes applying a predetermined number of pulses at each of a plurality of predetermined locations, then a distance between adjacent ones of the plurality of predetermined locations determines a pitch between adjacent ones of the features.

Regarding the step of providing a substrate, in one method the substrate comprises a silicon substrate and a plurality of pixel mirrors formed on the silicon substrate, and the alignment layer material is deposited over the plurality of pixel mirrors. In another method, the substrate comprises a transparent substrate having a transparent electrode layer formed thereon, and the alignment layer material is deposited over the transparent electrode layer.

A display device according to one embodiment of the invention includes a silicon substrate, a plurality of pixel mirrors formed over the silicon substrate, and an alignment layer formed over the plurality of pixel mirrors. The alignment layer includes an alignment surface opposite the plurality of pixel mirrors, and a surface morphology of the alignment surface includes a pattern of features formed therein that is indicative of laser annealing. The pitch between adjacent ones of the features can be approximately two micrometers and the roughness average (Ra) of the alignment surface can be between two and three nanometers. In a particular embodiment, the pattern of features includes a pattern of valleys defined on the alignment surface where the density of a material from which the alignment layer is formed is greater for areas associated with the valleys than for other areas of the alignment layer. The alignment layer can be formed from a spin-on dielectric (SOD) and, in particular, a SOD that comprises silicon dioxide.

The display device can further include a transparent substrate and a liquid crystal layer formed between the alignment layer and the transparent substrate, where orientations of liquid crystals in the liquid crystal layer are controlled by the pattern of features. The transparent substrate can itself include a second alignment layer formed over the transparent substrate and the liquid crystal layer can be formed between the alignment layer and the second alignment layer. In such an embodiment, the second alignment layer of the transparent substrate can include a second alignment surface facing the liquid crystal layer where a surface morphology of the second alignment surface includes a second pattern of features that are indicative of the second alignment surface having been laser annealed.

Another display device according to the present invention includes a transparent substrate, a transparent electrode layer formed over the transparent substrate, and an alignment layer (e.g., a SOD) formed over the transparent electrode layer. In such an embodiment, the alignment layer includes an alignment surface opposite the transparent electrode layer, where a surface morphology of the alignment surface includes a pattern of features formed therein that is indicative of laser annealing.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a new method for forming the alignment layer(s) of a liquid crystal display device by annealing a spin-on dielectric with laser light. Accordingly, the liquid crystal display devices of the invention feature alignment layer(s) that are very stable under prolonged, high-intensity light stress and that are easily and inexpensively manufactured with high throughput. In the following description, numerous specific details are set forth (e.g., particular laser scan traces, laser specifics, etc.) in order to provide a thorough understanding of the invention. Those skilled in the art will recognize, however, that the invention may be practiced apart from these specific details. In other instances, details of well-known wafer-processing practices (e.g., spin-on processes, wafer preparation processes, etc.) and components (e.g., wafer processing apparatuses, etc.) have been omitted, so as not to unnecessarily obscure the present invention.

Figure 2:
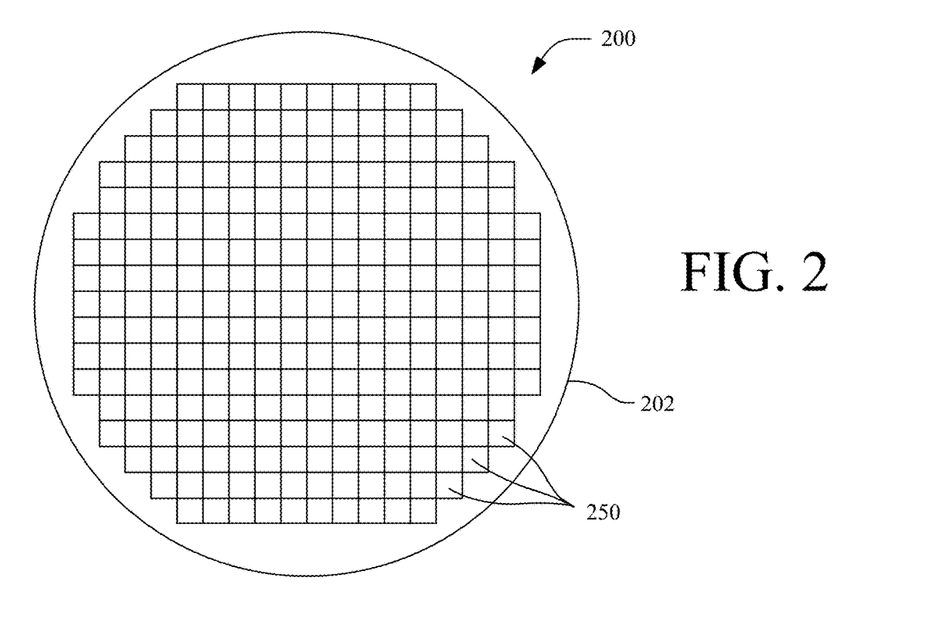
FIG. 2 is a top view showing a silicon wafer workpiece used for manufacturing liquid crystal display devices.

FIG. 2 is a top view of an exemplary silicon wafer workpiece 200. Silicon wafer workpiece 200 is a processed silicon wafer which includes a silicon substrate 202 and a plurality of discrete imager chips 250 formed on silicon substrate 202. As those skilled in the art will understand, each of imager chips 250 includes an array of pixel mirrors (not shown). Once silicon wafer workpiece 200 is diced, each of imager chips 250 will be associated with a discrete liquid crystal on silicon (LCOS) display device.

Figure 3:
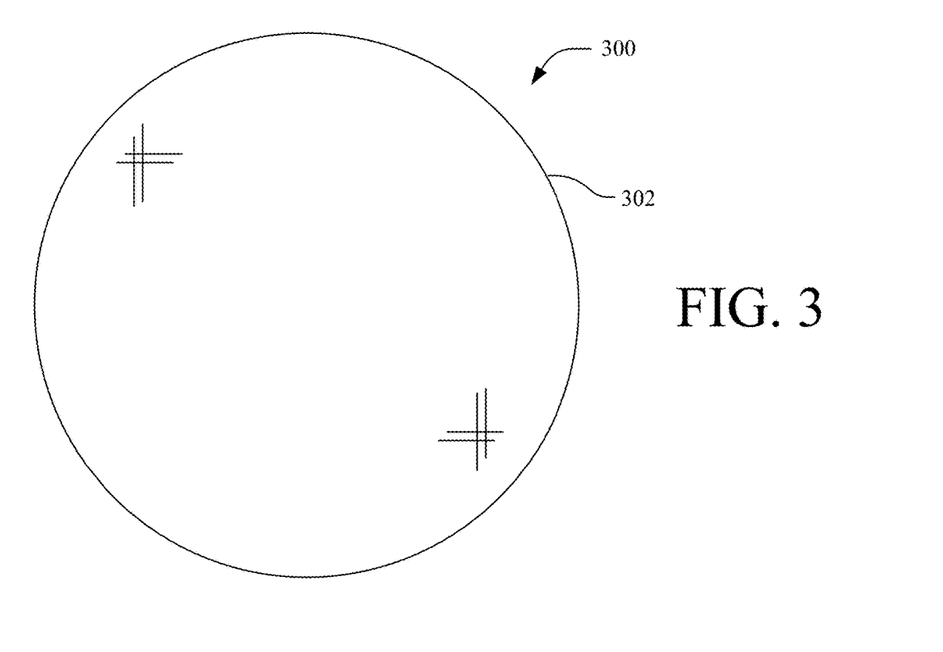
FIG. 3 is a top view of a transparent wafer workpiece used for manufacturing liquid crystal display devices.

FIG. 3 is a top view of an exemplary transparent wafer workpiece 300. Transparent wafer workpiece 300 includes a transparent substrate 302 (e.g., a glass wafer), which can have various layers formed thereon as will be described below. After processing, transparent wafer workpiece 300 can be aligned with silicon wafer workpiece 200 and diced such that portions of transparent wafer workpiece 300 will overlie respective imager chips 250, whereby liquid crystal material can be sandwiched therebetween.

Figure 4A:
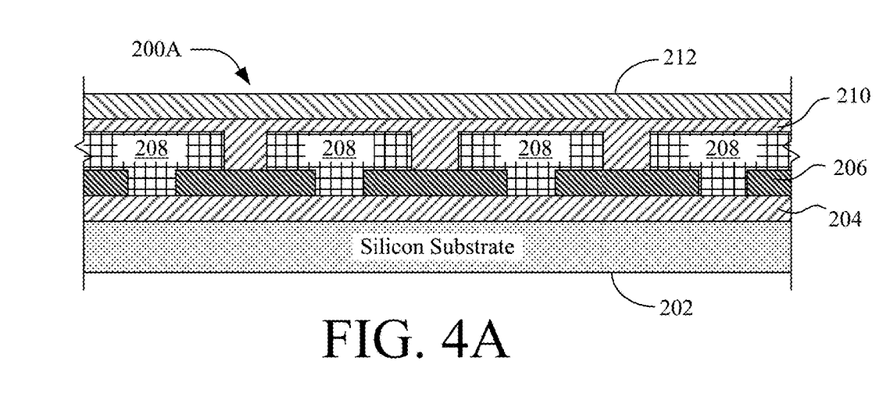
FIG. 4A is a cross-sectional view showing a silicon wafer workpiece at a first stage of a process for forming an alignment layer thereon according to the present invention.

FIG. 4A is a cross-sectional view showing silicon wafer workpiece 200 at a first stage of a process for forming an alignment layer thereon according to the present invention. Accordingly, silicon wafer workpiece 200 is denoted as workpiece 200A in FIG. 4A. Here, silicon wafer workpiece 200A is a processed silicon wafer that is ready to have a liquid crystal alignment layer formed thereon. In this embodiment, silicon wafer workpiece 200A includes a silicon substrate 202, at least one integrated circuitry layer 204 formed over silicon substrate 202, an insulating layer 206 formed over portions of integrated circuitry layer 204, and a plurality of pixel mirrors 208. A planarized layer 210 and a protective coating 212 are formed over the pixel mirrors 208. It should be noted that the thicknesses of the layers and elements depicted in FIG. 4A (and in subsequent figures) are optimized for clarity and are not drawn to scale.

The layers and elements of silicon wafer workpiece 200A are similar to the corresponding layers and elements of FIG. 1 and, therefore, will not be described again in detail. Moreover, silicon wafer workpiece 200A is exemplary in nature and can have additional or fewer layers and elements (e.g., additional insulating layers, etc.) than the ones shown.

Figure 4B:
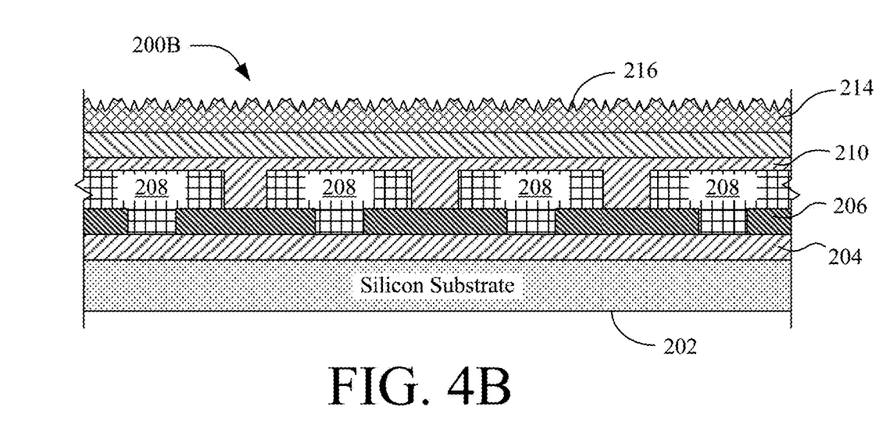
FIG. 4B is a cross-sectional view showing a silicon wafer workpiece at a second stage of a process for forming an alignment layer thereon.

FIG. 4B shows a second stage of forming an alignment layer according to the present invention, which yields silicon wafer workpiece 200B. In FIG. 4B, an alignment layer material 214 is formed over workpiece 200A in a deposition process. In a particular embodiment, alignment layer material 214 is a layer of spin-on dielectric (SOD), such as spin-on-glass (SOG) that is applied over protective coating 212 using a spin-on process. Even more particularly, SOD material 214 includes silicon dioxide ($SiO_2$), because $SiO_2$-based SOD is very resistant to prolonged light stress and will become denser with annealing. SOD material 214 can be applied at a thickness on the order of an optical thin film.

After SOD material 214 is applied and hardened from its flowable form, a top surface 216 of SOD material 214 will have a particular morphology, which is shown representationally in FIG. 4B as being jagged. SOD material 214 will be laser annealed to change the morphology of top surface 216 and form an alignment layer capable of aligning the liquid crystals of a liquid crystal layer.

While alignment layer material 214 will be described as SOD containing $SiO_2$ herein, alignment layer material 214 can comprise other materials that are resistant to light stress and susceptible to laser annealing. Moreover, the processes shown in FIGS. 4A and 4B can be combined, whereby a processed silicon wafer workpiece 200B already having alignment layer material 214 deposited thereon is provided, for example, where the SOD is applied by a different manufacturer.

Figure 4C:
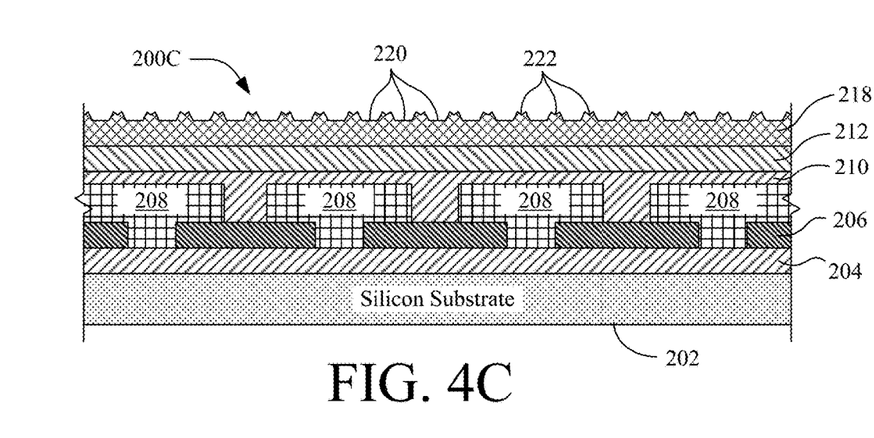
FIG. 4C is a cross-sectional view showing a silicon wafer workpiece at a third stage of a process for forming an alignment layer thereon.

FIG. 4C shows a third stage of forming an alignment layer according to the present invention, which yields silicon wafer workpiece 200C. In FIG. 4C, SOD material 214 has been treated with light, which alters the morphology of top surface 216 and yields alignment layer 218. In particular, a series of laser pulses is applied to SOD material 214 along a scan trace (FIG. 8) such that portions of SOD material 214 are annealed and densified. This annealing process changes the morphology of portions of top surface 216 associated with the densified SOD material 214 and thereby creates a first pattern of features 220, which are represented by the generally-parallel valleys 220 in FIG. 4C. The portions of top surface 216 that are associated with the non-annealed (or lesser annealed) portions of SOD material 214 retain more of the morphology of top surface 216 prior to laser annealing and, therefore, define a second pattern of features 222 interposed between the first pattern of features 220. Here, the second pattern of features 222 is shown as a plurality of generally-parallel ridges 222, which are located between the valleys 220. As indicated above, the annealing process makes the SOD material 214 denser in areas associated with valleys 220 compared with areas associated with ridges 222.

Figure 5A:
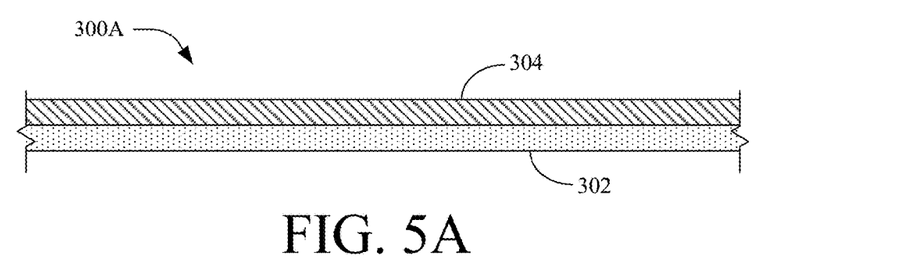
FIG. 5A is a cross-sectional view showing a transparent wafer workpiece at a first stage of a process for forming an alignment layer thereon according to the present invention.

FIG. 5A is a cross-sectional view showing transparent wafer workpiece 300 at a first stage of a process for forming an alignment layer thereon according to the present invention. Accordingly, transparent wafer workpiece 300 is denoted as transparent wafer workpiece 300A in FIG. 5A. In this first stage, a transparent wafer workpiece 300A is provided that is ready to have a liquid crystal alignment layer formed thereon. In this example, transparent wafer workpiece 300A includes transparent substrate 302 and a transparent electrode layer 304 (e.g., indium tin oxide, ITO) formed on transparent substrate 302. Although not shown, transparent wafer workpiece 300A might also include other pre-formed layers (e.g., anti-reflective coating(s), etc.).

Figure 5B:
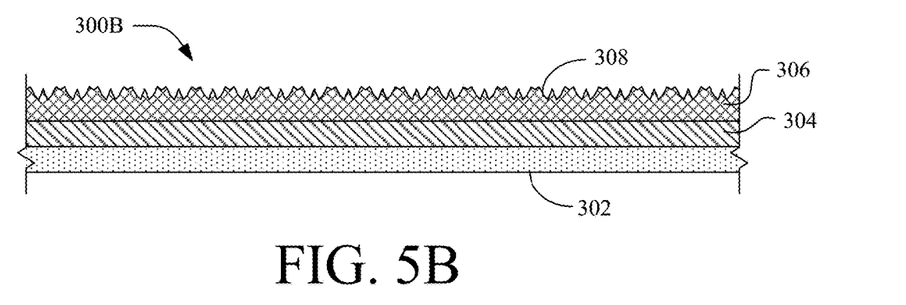
FIG. 5B is a cross-sectional view showing a transparent wafer workpiece at a second stage of a process for forming an alignment layer thereon.

FIG. 5B shows a second stage of forming an alignment layer according to the present invention, which yields transparent wafer workpiece 300B. In FIG. 5B, an alignment layer material 306 is formed over transparent electrode layer 304 in a deposition process. Like alignment layer material 214, alignment layer material 306 is an $SiO_2$-based SOD that is deposited over transparent electrode layer 304 using a spin-on process. After SOD material 306 is applied and is hardened from its flowable form, a top surface 308 of SOD material 306 will have a particular morphology, which is shown representationally in FIG. 5B as being jagged. Like before, the processes shown in FIGS. 5A and 5B can be combined, whereby a processed transparent wafer workpiece 300B is provided that already includes an alignment layer material 306 deposited thereon, for example, where the SOD is applied by a different manufacturer.

Figure 5C:
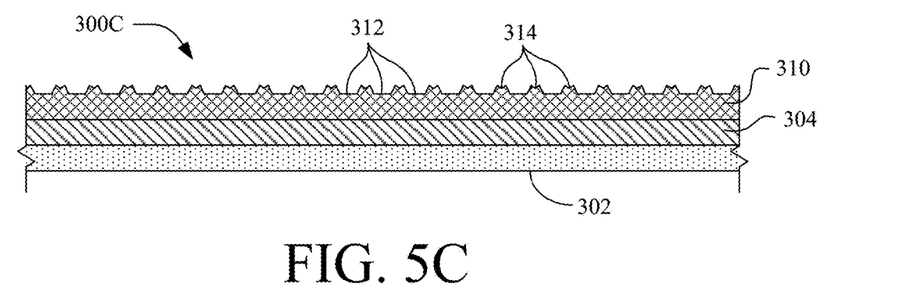
FIG. 5C is a cross-sectional view showing a transparent wafer workpiece at a third stage of a process for forming an alignment layer thereon.

FIG. 5C shows a third stage of forming an alignment layer according to the present invention, which yields transparent wafer workpiece 300C. In FIG. 5C, SOD material 306 has been treated with light, which alters the morphology of top surface 308 and yields alignment layer 310. In particular, a series of laser pulses is applied to SOD material 306 along a scan trace (see FIG. 8) such that portions of SOD material 306 are annealed and densified. The annealing process changes the morphology of portions of top surface 308 associated with the densified SOD material 306 and thereby creates a first pattern of features 312, which are represented by the generally-parallel valleys 312 in FIG. 5C. The portions of top surface 308 that are associated with the non-annealed (or lesser annealed) portions of SOD material 306 retain more of the morphology of top surface 308 prior to laser annealing and, therefore, define a second pattern of features 314 interposed between the first pattern of features 312. Here, the second pattern of features 314 is shown as a plurality of generally-parallel ridges 314, which are located between the valleys 312. As with workpiece 200C, the SOD material 306 is denser in areas associated with valleys 312 than in areas associated with ridges 314.

Figure 6:
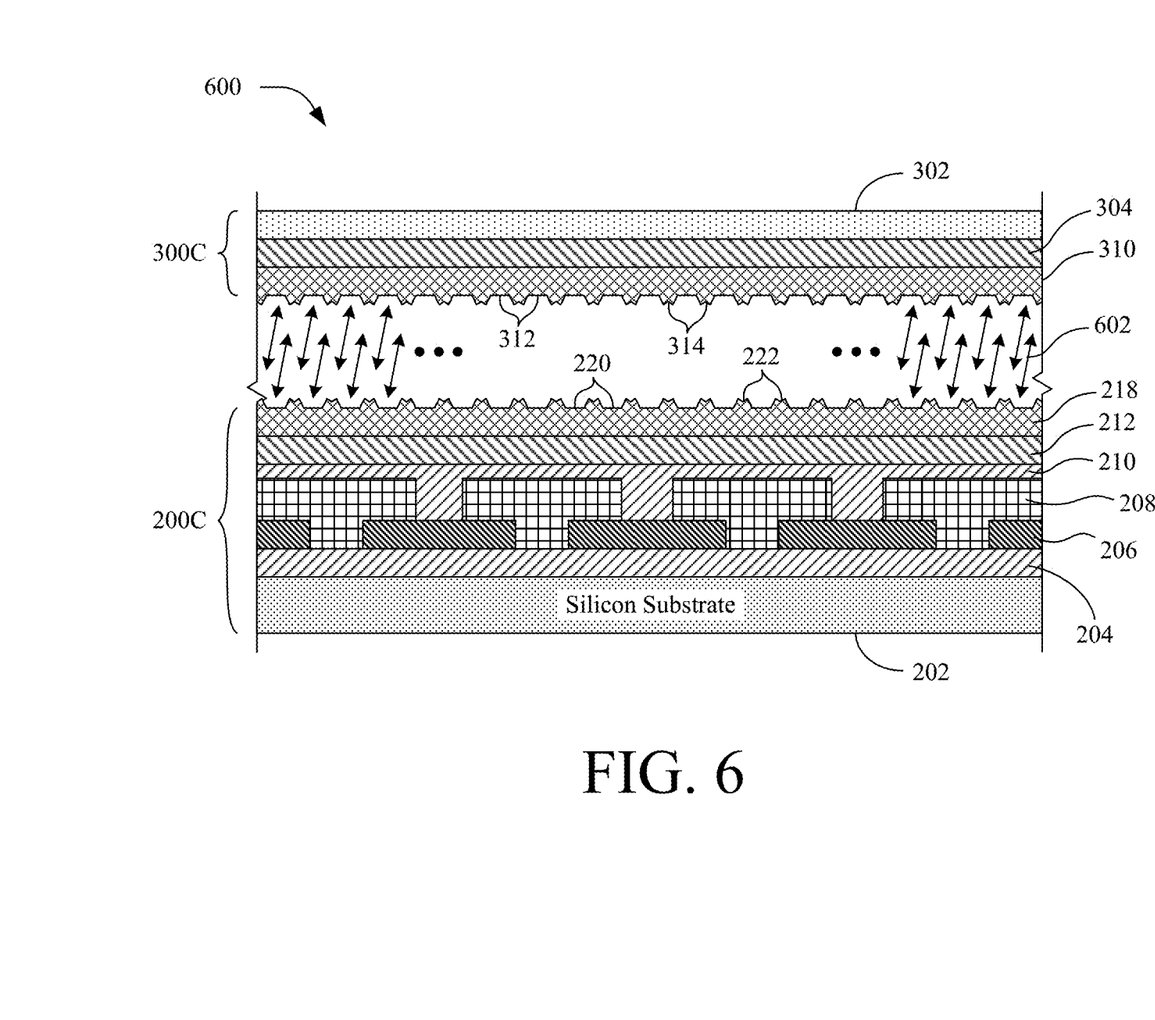
FIG. 6 is a cross-sectional view showing a liquid display device having light-annealed alignment layers according to the present invention.

FIG. 6 is a cross-sectional view of an assembled LCOS display device 600 having laser-annealed alignment layers 218 and 310 according to the present invention. As shown in FIG. 6, display device 600 includes a portion of transparent wafer workpiece 300C, which has been inverted and positioned over an associated portion of silicon wafer workpiece 200C, such that alignment layers 218 and 310 are facing each other. A liquid crystal layer 602 is formed between the alignment layers 218 and 310.

As shown in FIG. 6, the altered surface morphologies of the laser-annealed alignment layers 218 and 310 facilitate alignment of the liquid crystals of layer 602 based on the orientations of the valleys 220 and 312 and the ridges 222 and 314 of alignment layers 218 and 310, respectively. Because alignment layers 218 and 310 are made from a SOD including SiO$_2$, their surface morphologies are very robust and will not degrade even after many hours of high-intensity light stress. The invention, therefore, provides this very important advantage over prior art displays that use organic (e.g., polyimide) alignment layers. Moreover, because the SOD used in layers 218 and 310 is applied with a spin-on process, the invention facilitates the application of alignment layer material much more quickly, simply, and less expensively than prior art evaporation deposition methods. The laser annealing process is also faster, simpler, and cheaper than prior art evaporation deposition methods. Accordingly, the invention facilitates production of alignment layers that have high longevity at a reduced cost, while significantly increasing wafer throughput and device production.

It will be understood that liquid crystal display device 600 can include additional, fewer, or alternative elements (e.g., a gasket surrounding liquid crystal layer 602, anti-reflective coatings, etc.) as those shown in FIG. 6. Additionally, the orientations of alignment layers 218 and 310 with respect to each other can be altered, for example, depending on the rotational orientations of the substrates 200C and 300C when coupled together.

Figure 7:
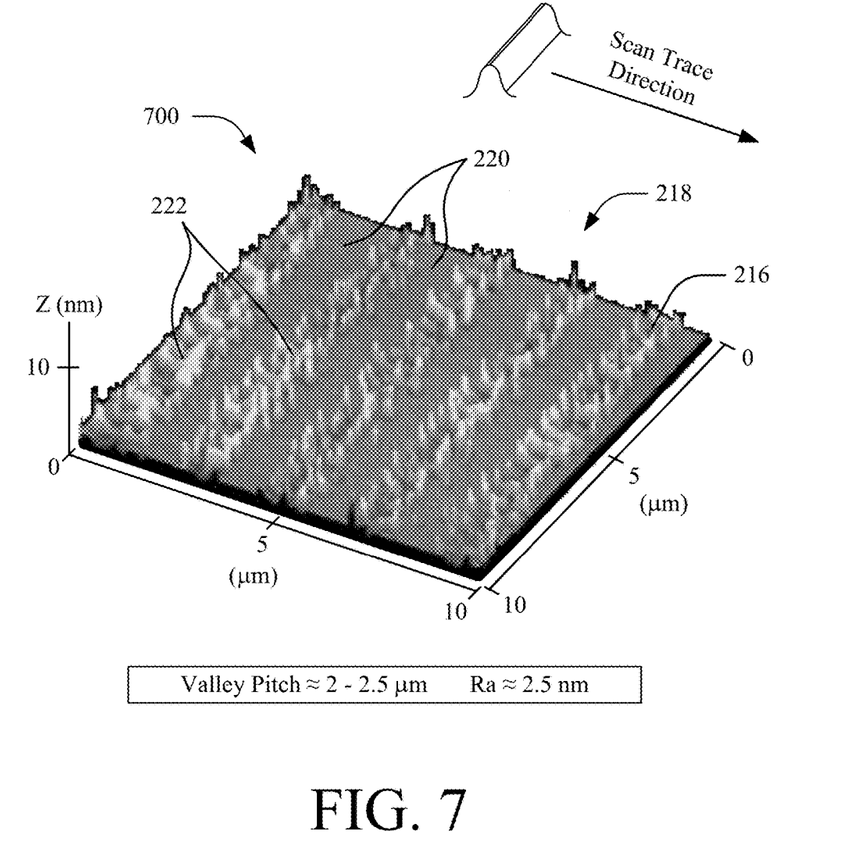
FIG. 7 is a micrograph image of an alignment layer formed by laser annealing according to the present invention.

FIG. 7 is a micrograph image 700 of alignment layer 218 (or alternatively alignment layer 310) that has been formed by laser annealing according to the present invention. As shown in image 700, alignment layer 218 includes the first pattern of features 220 and the second pattern of features 222. Features 220 correspond with the annealed portions of alignment layer 218 and are associated with denser SOD material 214, and features 222 correspond with the non-annealed (or lesser annealed) portions of SOD material 214 that are less dense. In FIG. 7, the first pattern of features 220 is shown as a pattern of generally-parallel valleys 220 and the second pattern of features 222 is shown as a pattern of generally-parallel ridges 222.

The alternating nature of the valleys 220 and ridges 222 give alignment layer 218 a consistent, striped form. In this embodiment, the pitch between valleys 220 is approximately two to two-and-a-half micrometers (2.0-2.5 μm). However, this pitch can be adjusted as desired, for example, to obtain a predetermined number of valleys 220 (or ridges 222) per pixel of the display device.

FIG. 7 also provides other information about the surface morphology of alignment layer 218. For example, FIG. 7 indicates that the roughness average (Ra) of the annealed surface of alignment layer 218 is approximately 2.5 nanometers. Furthermore, FIG. 7 shows that the locations of valleys 220 and ridges 222 alternate along the direction of a scan trace that is traversed during the laser-annealing process of alignment layer 218. In this embodiment, the long direction of valleys 220 and ridges 222 is shown as being generally perpendicular to the scan direction. In other embodiments, the long direction of valleys 220 and ridges 222 can be oblique or even parallel to the direction of the scan trace.

It should also be noted that the first pattern of features 220 and the second pattern of features 222 of annealed alignment layer 218 are described herein as patterns of "valleys" and "ridges" for convenience. Accordingly, this terminology should not be construed in such a way that limits the scope of the invention. For example, in some instances or at some locations, a feature characterized as a ridge or part of a ridge might have portions with a lower elevation than a feature characterized as a valley or part of a valley. As another example, the patterns of features 220 and 222 might also be characterized as flattened portions 220 and jagged portions 222, respectively. Importantly, the patterns of features 220 and 222 shown in FIG. 7 are intended to illustrate that the laser-annealing process of the invention alters the surface morphology of the alignment layer material 214 in some desirable way such that the annealed alignment layer material 214 will function as a liquid crystal alignment layer 218 in a liquid crystal display device. More particularly, an alignment layer of the invention has an altered surface morphology with patterns of features that are defined in part by a laser scan trace (see FIG. 8). In turn, the orientations of the liquid crystals in the liquid crystal layer are aligned and controlled (e.g., restrained) by these features also according to the laser scan trace.

Figure 8:
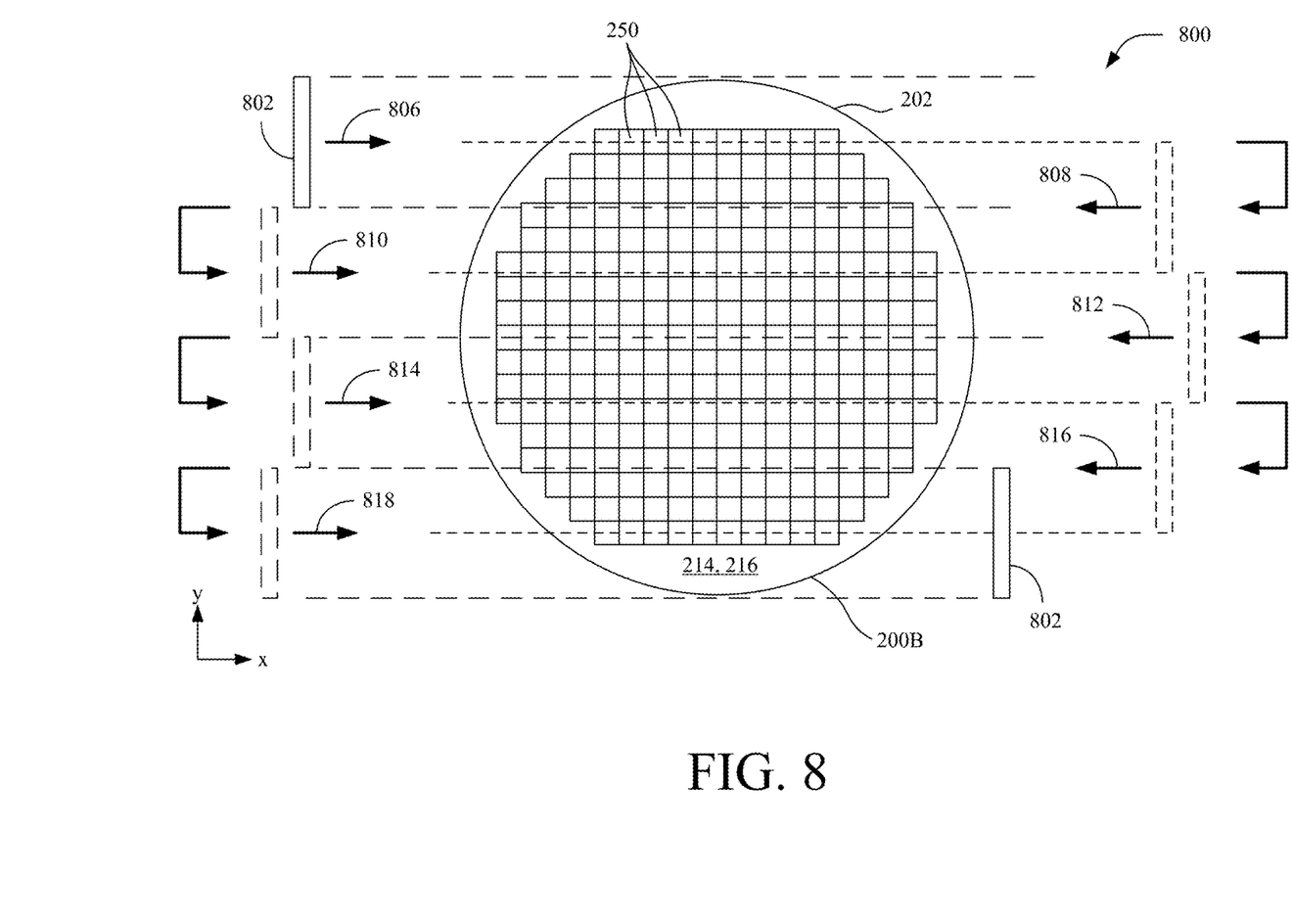
FIG. 8 is a diagram showing an exemplary laser scan trace pattern for annealing an alignment layer material of the silicon wafer workpiece of FIG. 4B and/or the transparent wafer workpiece of FIG. 5B.

FIG. 8 is a diagram showing an exemplary laser scan trace 800 along which a series of pulses of a laser beam 802 are applied to SOD material 214 to produce laser-annealed alignment layer 218 according to the present invention. While scan trace 800 is described with reference to silicon wafer workpiece 200B, scan trace 800 can also be used to anneal SOD material 306 of transparent wafer workpiece 300B.

As shown in FIG. 8, scan trace 800 comprises a plurality of parallel horizontal paths 806-818. A pulse laser (not shown) applies a series of pulses of laser beam 802 to SOD material 214 in a back-and-forth manner along these horizontal paths 806-818. Left-to-right horizontal paths 806, 810, 814, and 818 of scan trace 800 are indicated by long-dashed lines, whereas right-to-left horizontal paths 808, 812, and 816 of scan trace 800 are indicated with short-dashed lines.

Pulses of laser beam 802 are applied to SOD material 214 from left to right across silicon wafer workpiece 200B along horizontal path 806. Once across silicon wafer workpiece 200B, the laser aperture (e.g., beam slit, not shown) is repositioned with respect to silicon wafer workpiece 200B to the beginning of horizontal path 808. Then, pulses from laser beam 802 are applied to SOD material 214 from right to left across silicon wafer workpiece 200B along horizontal path 808. Once across silicon wafer workpiece 200B, the laser aperture is repositioned with respect to silicon wafer workpiece 200B to the beginning of horizontal path 810. Thereafter, pulses of a laser beam 802 are applied to SOD material 214 from left to right along horizontal path 810. Once across silicon wafer workpiece 200B, the laser aperture is repositioned with respect to silicon wafer workpiece 200B to the beginning of horizontal path 812. Thereafter, pulses from laser beam 802 are applied to SOD material 214 from right to left along horizontal path 812, and so on until scan trace 800 is complete.

Once laser annealing is completed, silicon wafer workpiece 200C will have been created and will have an alignment layer 218 with an altered surface morphology sufficient to align the liquid crystals of layer 602. Referring back to FIG. 7, scan trace 800 yields a first pattern of feature 220 and a second pattern of features 222 that follow (alternate along) the scan directions of horizontal paths 806-818. In turn, because the liquid crystals in the liquid crystal layer 602 are aligned according to the orientations of the features 220 and 222, the alignment of the liquid crystals is also based at least in part on the laser scan trace.

In the present embodiment, laser beam 802 is rectangular in shape (e.g., 27 mm×6 μm) and pulses are applied to SOD material 214 with the long direction of laser beam 802 oriented generally perpendicularly to the scan directions along horizontal paths 806-818. However, other laser beam orientations (e.g., obliquely, parallel, etc.) with respect to scan direction of the trace can be used. It should also be understood that scan trace 800 can be completed either by moving silicon wafer workpiece 200B relative to the aperture producing laser beam 802 or by moving the laser beam 802 (e.g., mechanically or optically) relative to silicon wafer workpiece 200B.

FIG. 8 also shows that each subsequent horizontal path overlaps with the prior horizontal path by a predetermined amount, which in this embodiment is approximately 50%. For example, horizontal path 808 overlaps horizontal path 806 by approximately 50%, horizontal path 810 overlaps horizontal path 808 by approximately 50%, and so on. Accordingly, the pulses from laser beam 802 applied along one horizontal path will also overlap pulses applied along the prior horizontal path by the predetermined amount. The overlap ensures that the patterns of features (e.g., valleys 220 and ridges 222) of the resulting alignment layer 218 are well-defined after laser annealing. While 50% overlap is used in FIG. 8, other overlaps (e.g., 40%, 60%, etc.) can be used. As another option, trace 800 can include additional horizontal paths at the top and bottom of silicon wafer 202 to ensure overlap coverage of the top half of horizontal path 806 and the bottom half of horizontal path 818.

The scan trace 800 and laser beam 802 shown in FIG. 8 are exemplary in nature. It should, therefore, be understood that other scan traces and laser beam geometries can be used as desired. For example, if a laser beam extending the full diameter of the wafer 200B in the vertical (y) direction is used, then fewer (e.g., only one) horizontal pass(es) would be needed. At the other extreme, if a small, round spot beam was used, then the scan trace would include many more horizontal passes. As yet another example, laser pulses could be applied along vertical or oblique paths. As still another example, the long-direction of laser beam 802 could be oriented parallel or obliquely to the paths of the scan trace, as mentioned above. These and other alternatives will be apparent in view of this disclosure.

It should also be noted that the horizontal paths 806-818 in FIG. 8 are shown to extend way beyond the limits of wafer 200B for clarity. However, it will be understood that pulses from laser beam 802 do not need to be applied beyond the limits of wafer 200B and/or do not need to be applied where annealing of alignment layer 214 is not necessary.

Figure 9:
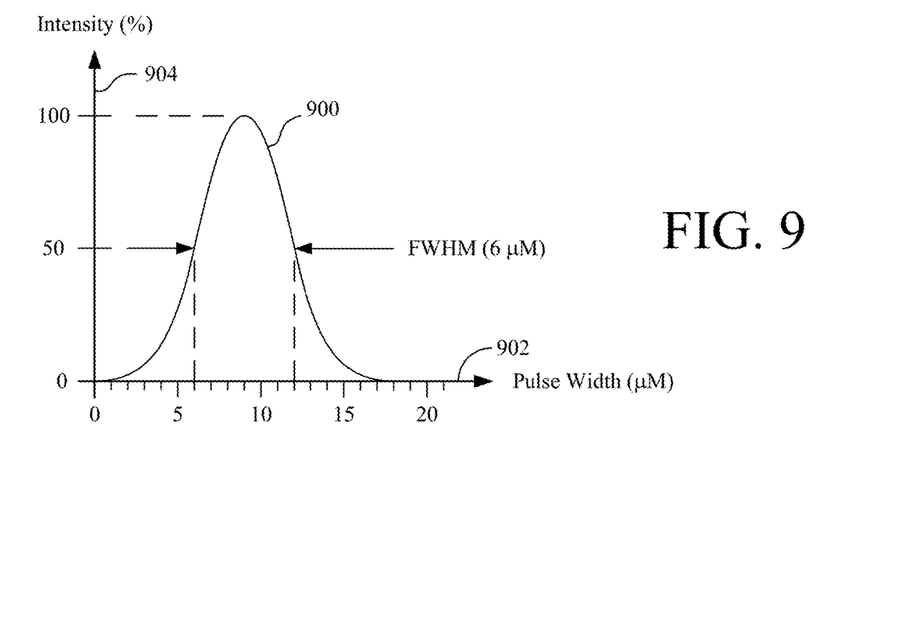
FIG. 9 is a graph of an intensity profile for an exemplary laser beam used with the present invention.

FIG. 9 is a graph of an intensity profile 900 along the width of the short direction of laser beam 802. Pulse width (in micrometers, μm) is shown along the horizontal axis 902, whereas intensity as a percentage of full intensity (%) is shown along vertical axis 904. As shown, laser beam 802 has a Gaussian intensity distribution along its pulse width. A common statistical reference used to characterize Gaussian pulse width is "full width at half maximum" (FWHM). FWHM refers to the full width of the laser beam 802 measured at half (50%) its maximum intensity. In this example, laser beam 802 has a pulse width of 6 μm at FWHM.

In a particular embodiment, a laser beam 802 having a width of six micrometers (6 μm) at FWHM can be used to anneal alignment layers 218 and 310. Such a laser beam 802 can also have a wavelength in the green region of the spectrum (e.g., 515 nm), a pulse duration of 300-500 nanoseconds (ns), and an energy density of 0.5-3.0 Joules per square centimeter ($J/cm^2$) to facilitate annealing. At these specifications, a linear scan rate of approximately 20 mm per second at a laser pulse rate of 10 kilohertz (kHz) is possible if the laser beam is moved by two micrometers (2 μm) between each pulse.

Figure 10:
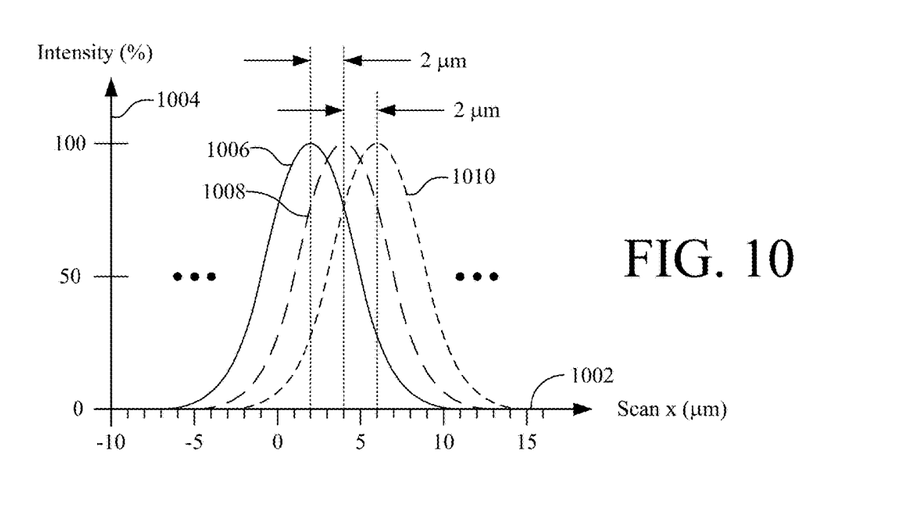
FIG. 10 is a graph of the intensity profiles for three consecutive pulses of the laser beam of FIG. 9 at some point along the scan trace of FIG. 8.

FIG. 10 is a graph of intensity profiles for three consecutive pulses of laser beam 802, which are applied to anneal SOD material 214 at some arbitrary location along horizontal path 806 of scan trace 800 shown in FIG. 8. Location (in μm) along horizontal path 806 is shown along horizontal axis 1002, whereas intensity of each pulse of laser beam 802 as a percentage of full intensity (%) is shown along vertical axis 1004. Like in FIG. 9, the intensity profiles are shown for the width (e.g., the 6 μm dimension) of laser beam 802. While FIG. 10 will be described with respect to SOD material 214, the following description is also applicable to SOD material 306 of transparent wafer workpiece 300B.

A first pulse 1006 of laser beam 802 (shown in solid) is applied to SOD material 214 with its intensity peak at a first location (x=2 μm in this example) along horizontal path 806. The silicon wafer workpiece 200B and/or the position of the laser beam 802 is then moved by a predetermined amount such that laser beam 802 targets a second location along horizontal path 806. Then a second pulse 1008 of laser beam 802 (shown in long dashes) is applied to SOD material 214 with its intensity peak at the second location (x=4 μm in this example). The silicon wafer workpiece 200B and/or the position of the laser beam 802 is then moved by the predetermined amount to a third location along horizontal path 806. There, a third pulse 1010 of laser beam 802 (shown in short dashes) is applied to SOD material 214 with its intensity peak at the third location (x=6 μm in this example).

The predetermined distance between consecutive laser pulses has been set at 2 micrometers in this example. Accordingly, a pulse of laser beam 802 is applied every two micrometers along horizontal path 806 of scan trace 800. Thereafter, pulses are applied at the predetermined distance along each consecutive horizontal path 808-818 until scan trace 800 is complete. However the pulse locations move from right to left for horizontal paths 808, 812, and 816.

The energy delivered to SOD material 214 by the series of pulses of laser beam 802 anneals SOD material 214 and, thereby, creates the first pattern of features (valleys) 220 and the second pattern of features (ridges) 222 shown in FIG. 7. Additionally, the pitch between locations where laser pulses (e.g., pulses 1006, 1008, and 1010) are applied determines the pitch between the features of alignment layer 218. For example, if the pitch between the locations of where laser pulses are applied changes, then the pitch between valleys 220, as well as the pitch between ridges 222, will also change. Changing the pitch is desirable, for example, to ensure that a particular number of features (e.g., valleys) are located over each pixel in a pixel array. The location of valleys 220 of alignment layer 218 will generally correspond to the locations of the intensity peaks of the laser pulses 1006, 1008, and 1010. In this example, the valleys 220 would be located at approximately x=2 μm, x=4 μm, x=6 μm, etc. and have a pitch of approximately 2 μm. However, pitches of above 10 μm and below 0.2 μm are possible.

In the above example, one pulse of laser beam 802 is applied at each location along the horizontal paths 806-818. However, in some cases it might be desirable to apply multiple pulses of laser beam 802 at each location, for example, for lower powered lasers or where more energy needs to be delivered to change the surface morphology of the alignment layer material 214.

Methods of the present invention will now be described with reference to FIGS. 11-12. For the sake of clear explanation, these methods might be described with reference to particular elements of the previously-described embodiments. However, it should be noted that other elements, whether explicitly described herein or created in view of the present disclosure, could be substituted for those cited without departing from the scope of the present invention. Therefore, it should be understood that the methods of the present invention are not limited to any particular elements that perform any particular functions. Furthermore, some steps of the methods presented herein need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 11:
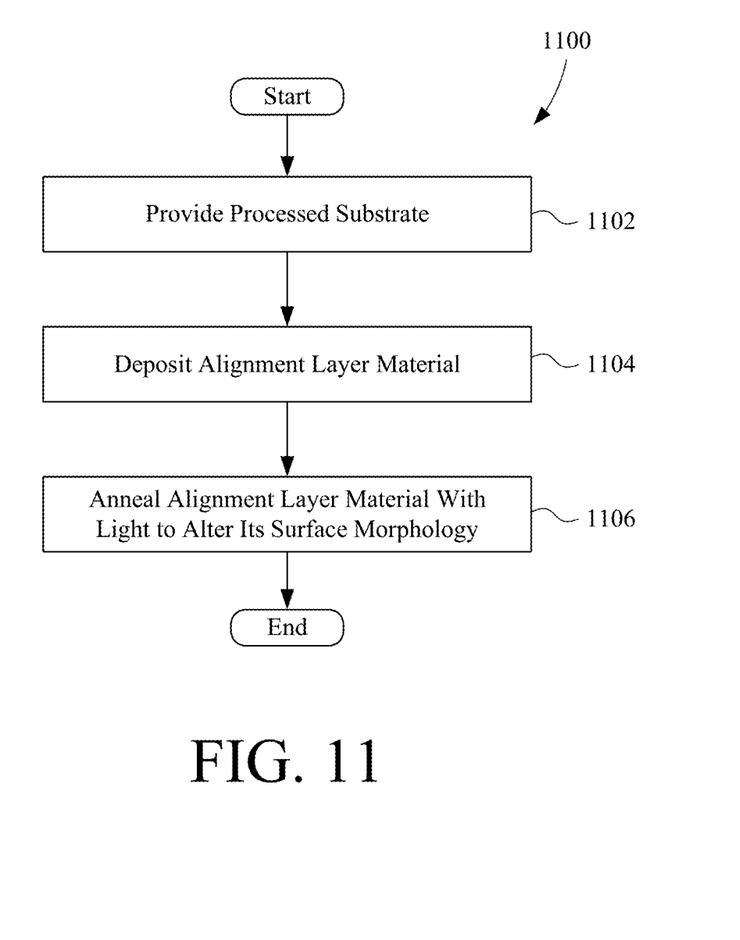
FIG. 11 is a flowchart summarizing one method for forming an alignment layer of a display device according to the present invention.

FIG. 11 is a flowchart summarizing one method 1100 for forming an alignment layer of a display device according to the present invention. In a first step 1102, a processed substrate used in the manufacture of one or more display devices (e.g., silicon wafer workpiece 200A, transparent wafer workpiece 300A) is provided. In a second step 1104, an alignment layer material (e.g., SOD including $SiO_2$) is deposited over the substrate, for example, using a spin-on process. Then, in a third step 1106, light (e.g., a series of pulses 1006-1010 from a pulse laser) is applied to the alignment layer material to alter its surface morphology sufficiently for the annealed alignment layer material to facilitate alignment of the liquid crystals of a subsequently formed liquid crystal layer.

Figure 12:
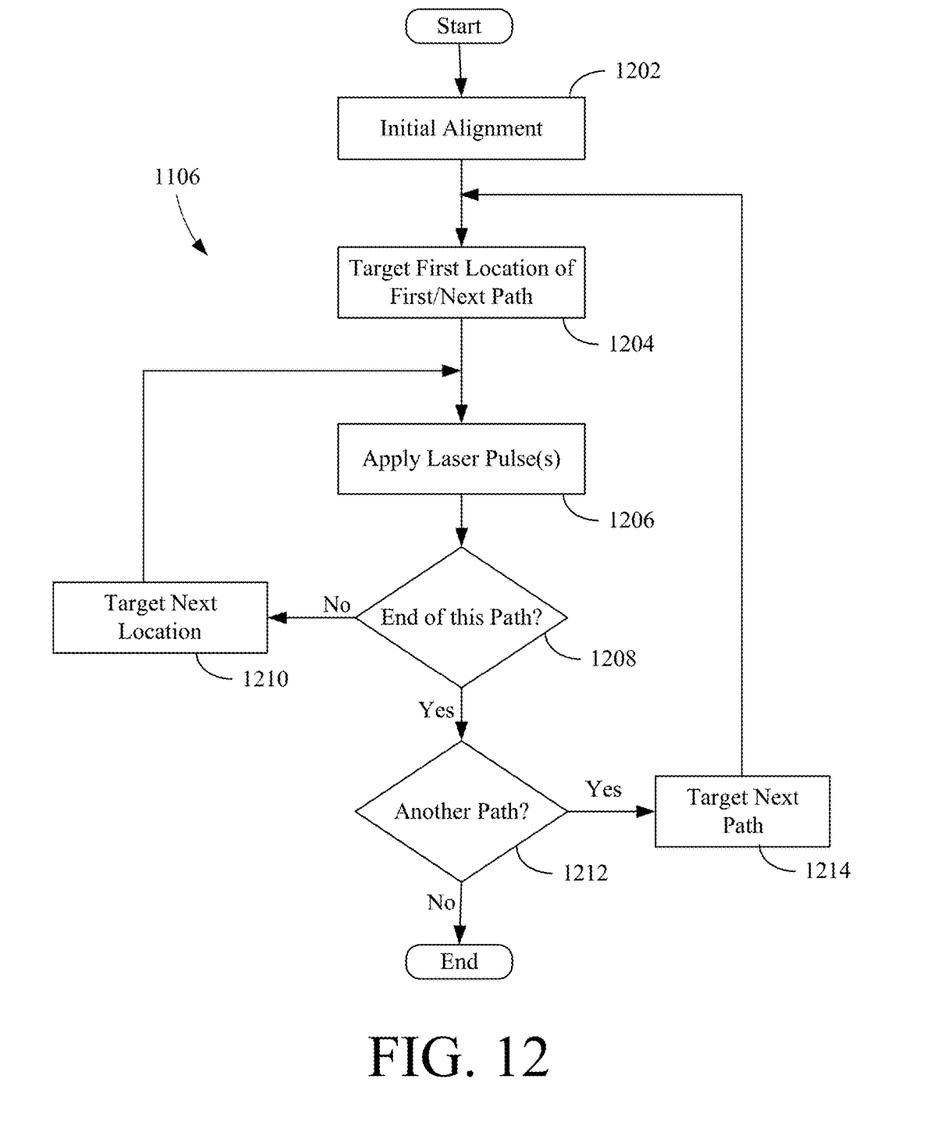
FIG. 12 is a flowchart summarizing a particular method for performing the third step (anneal alignment layer material) according to the present invention.

FIG. 12 is a flowchart summarizing a method for performing step 1106 (anneal alignment layer material with light) of method 1100. In a first step 1202, the processed substrate is optionally loaded into a wafer-processing apparatus and undergoes any desirable initial alignment and calibration procedure(s) (e.g., locating the wafer with respect to the laser aperture, etc.). Then, in a second step 1204, a first predetermined position over the processed substrate for applying the laser beam is targeted, for example, by moving the substrate, moving the aperture of the pulse laser, adjusting an optical system that directs the laser beam from the pulse laser, etc. Then, in a third step 1206, a predetermined number of laser pulse(s) (e.g., one, etc.) is applied to the alignment layer material of the substrate at the first predetermined position. Then, in a fourth step 1208, a check is made to determine if the end of a current path (e.g., horizontal path 806) of the laser scan trace (e.g., scan trace 800) has been reached. If not, then in a fifth step 1210, a next predetermined position over the processed substrate is targeted (e.g., by moving the target location by 2 μm) and the method returns to step 1206 such that the predetermined number of laser pulses is applied to the alignment layer material at the next position.

However, if in step 1208, it is determined that the end of the current path of the laser scan trace has been reached, then the method continues to a sixth step 1212. In sixth step 1212, it is determined if another path (e.g., horizontal path 808) in the scan trace needs to be traversed and annealed. If yes, then in a seventh step 1214, the next path is targeted to provide a predetermined overlap (e.g., 50%) with respect to the prior path. Then, method 1106 proceeds to second step 1204 where the first predetermined location of the next path is targeted. If, however, in step 1212, it is determined that no additional path needs to be annealed (e.g., the full scan trace is complete), then method 1106 ends and the substrate can optionally be removed from the wafer processing apparatus.

The description of particular embodiments of the present invention is now complete. Many of the described features may be substituted, altered or omitted without departing from the scope of the invention. For example, alternate laser scan traces (e.g., vertical) and laser beam dimensions, may be substituted for the laser scan trace 800 and laser beam 802. As another example, other desirable patterns of features can be laser annealed into the surfaces of the alignment layers in place of the striped features 220 and 222 that are shown. These and other deviations from the particular embodiments shown will be apparent to those skilled in the art, particularly in view of the foregoing disclosure.

We claim:

1. A method of forming an alignment layer of a display device, said method comprising:
   providing a substrate having an alignment layer material deposited thereon; and
   applying light to said alignment layer material;
   said step of applying light alters a surface morphology of a surface of said alignment layer material; and wherein
   said step of applying light to said alignment layer material includes applying a series of pulses from a pulse laser to anneal portions of said alignment layer material; and
   said alignment layer material includes an oxide.

2. The method of claim 1, wherein said series of pulses is applied along a predetermined path with respect to said substrate.

3. The method of claim 2, further comprising:
   applying a predetermined number of pulses to said alignment layer material at a first location along said predetermined path to alter said surface morphology of said alignment layer material near said first location; and
   applying said predetermined number of laser pulses to said alignment layer material at a second location along said predetermined path to alter said surface morphology of said alignment layer material near said second location.

4. The method of claim 3, wherein said predetermined number is one.

5. The method of claim 2, wherein:
   said series of pulses is applied along a plurality of parallel paths; and
   said parallel paths are defined such that exposure areas of adjacent ones of said parallel paths overlap by a predetermined amount.

6. The method of claim 5, wherein said predetermined amount is approximately 50%.

7. The method of claim 1, wherein said step of applying said series of laser pulses from said pulse laser creates a repetitive pattern of features on said surface of said alignment layer material.

8. The method of claim 7, wherein:

said step of applying said series of pulses from said pulse laser includes applying a predetermined number of pulses at each of a plurality of predetermined locations; and a distance between adjacent ones of said plurality of predetermined locations determines a pitch between adjacent ones of said features.

9. The method of claim 7, wherein said pattern of features comprises a plurality of generally-parallel valleys.

10. The method of claim 1, wherein said alignment layer material comprises spin-on dielectric (SOD).

11. The method of claim 10, wherein said SOD comprises silicon dioxide.

12. The method of claim 1, wherein said step of providing said substrate includes depositing said alignment layer material over said substrate using a spin-on process.

13. The method of claim 12, wherein said alignment layer material comprises spin-on dielectric (SOD).

14. The method of claim 1, wherein:

said substrate comprises a silicon substrate and a plurality of pixel mirrors formed on said silicon substrate; and said alignment layer material is deposited over said plurality of pixel mirrors.

15. The method of claim 1, wherein:

said substrate comprises a transparent substrate having a transparent electrode layer formed thereon; and said alignment layer material is deposited over said transparent electrode layer.

16. A display device comprising:

a silicon substrate;

a plurality of pixel mirrors formed over said silicon substrate; and an alignment layer formed over said plurality of pixel mirrors; and wherein said alignment layer includes an alignment surface opposite said plurality of pixel mirrors; and a surface morphology of said alignment surface includes a pattern of features formed therein, said pattern of features being indicative of laser annealing; and wherein said alignment layer includes an oxide.

17. The display device of claim 16, wherein said pattern of features includes a pattern of valleys defined on said alignment surface.

18. The display device of claim 17, wherein the density of a material from which said alignment layer is formed is greater for areas associated with said valleys than for other areas of said alignment layer.

19. The display device of claim 16, wherein said alignment layer comprises a spin-on dielectric (SOD).

20. The display device of claim 19, wherein said SOD comprises silicon dioxide.

21. The display device of claim 16, further comprising:

a transparent substrate;

a liquid crystal layer formed between said alignment layer and said transparent substrate; and wherein orientations of liquid crystals in said liquid crystal layer are controlled by said pattern of features.

22. The display device of claim 16, further comprising:

a transparent substrate;

a second alignment layer formed over said transparent substrate; and a liquid crystal layer formed between said alignment layer and said second alignment layer; and wherein said second alignment layer includes a second alignment surface facing said liquid crystal layer; and a surface morphology of said second alignment surface includes a second pattern of features formed therein, said second pattern of features being indicative of laser annealing.

23. A display device comprising:

a transparent substrate;

a transparent electrode layer formed over said transparent substrate; and an oxide alignment layer formed over said transparent electrode layer; and wherein said oxide alignment layer includes an alignment surface opposite said transparent electrode layer; and a surface morphology of said alignment surface includes a pattern of features formed therein, said pattern of features being indicative of laser annealing.

24. The display device of claim 23, wherein said oxide alignment layer comprises a spin-on dielectric.

* * * * *